US007009823B2

(12) United States Patent
Yoon et al.

(10) Patent No.: US 7,009,823 B2
(45) Date of Patent: Mar. 7, 2006

(54) ENERGY RECOVERY CIRCUIT AND ENERGY RECOVERY METHOD USING THE SAME

(75) Inventors: Won Sik Yoon, Kimhae-shi (KR); Feel Soon Kang, Pusan (KR); Han Woong Park, Jinhae-shi (KR); Cheul U Kim, Pusan (KR)

(73) Assignee: LG Electronics Inc., Seoul (KR)

( * ) Notice: Subject to any disclaimer, the term of this patent is extended or adjusted under 35 U.S.C. 154(b) by 283 days.

(21) Appl. No.: 10/183,382

(22) Filed: Jun. 28, 2002

(65) Prior Publication Data

US 2004/0001290 A1 Jan. 1, 2004

(51) Int. Cl.
*H02H 7/16* (2006.01)

(52) U.S. Cl. ........................................................ 361/15

(58) Field of Classification Search .................. 361/18, 361/58, 15; 345/60, 204; 359/250; 315/169.2, 315/169.3

See application file for complete search history.

(56) References Cited

U.S. PATENT DOCUMENTS

| | | | | |
|---|---|---|---|---|
| 3,435,431 | A * | 3/1969 | Baer et al. | 365/239 |
| 4,253,097 | A * | 2/1981 | Hochstrate | 345/102 |
| 4,736,151 | A * | 4/1988 | Dishner | 323/224 |
| 4,866,349 | A * | 9/1989 | Weber et al. | 315/169.4 |
| 5,043,637 | A * | 8/1991 | Gries et al. | 315/371 |
| 5,438,290 | A * | 8/1995 | Tanaka | 327/108 |
| 5,642,018 | A * | 6/1997 | Marcotte | 315/169.4 |
| 5,670,974 | A * | 9/1997 | Ohba et al. | 345/60 |
| 5,943,030 | A * | 8/1999 | Minamibayashi | 345/60 |
| 6,011,355 | A * | 1/2000 | Nagai | 315/169.3 |
| 6,160,531 | A * | 12/2000 | Chen et al. | 345/60 |
| 6,175,192 | B1 * | 1/2001 | Moon | 315/169.3 |
| 6,243,277 | B1 * | 6/2001 | Sun et al. | 363/65 |
| 6,480,189 | B1 * | 11/2002 | Ide | 345/211 |
| 6,538,627 | B1 * | 3/2003 | Whang et al. | 345/60 |
| 6,583,575 | B1 * | 6/2003 | Roh et al. | 315/169.1 |
| 6,646,387 | B1 * | 11/2003 | Chae et al. | 315/165 |
| 6,680,581 | B1 * | 1/2004 | Lee et al. | 315/169.3 |
| 6,727,659 | B1 * | 4/2004 | Kim et al. | 315/169.1 |
| 6,850,213 | B1 * | 2/2005 | Marcotte | 345/60 |
| 6,906,471 | B1 * | 6/2005 | Roh et al. | 315/169.4 |
| 6,917,351 | B1 * | 7/2005 | Velayudhan et al. | 345/60 |

* cited by examiner

*Primary Examiner*—Brian Sircus
*Assistant Examiner*—James A. Demakis
(74) *Attorney, Agent, or Firm*—Fleshner & Kim, LLP

(57) ABSTRACT

An energy recovery circuit wherein an energy stored in an inductor is applied to a panel to reduce a charge time and improve an energy recovery efficiency. In the energy recovery circuit, a switch, a capacitor and an inductor is provided to form a closed loop. A panel capacitor is equivalently provided at the panel. When the switch is turned on, a current component of an energy is charged in the inductor by an energy charged in the capacitor. When the switch is turned off, an inverse voltage is inducted into the inductor and a closed loop is formed by the inductor and the panel capacitor, thereby applying only an inverse voltage of the inductor to the panel capacitor.

42 Claims, 6 Drawing Sheets

ENERGY RECOVERY CIRCUIT AND ENERGY RECOVERY METHOD USING THE SAME

BACKGROUND OF THE INVENTION

1. Field of the Invention

This invention relates to an energy recovery technique, and more particularly to an energy recovery circuit wherein energy stored in an inductor is fed to a panel so as to reduce a charge time and enhance energy recovery efficiency. The present invention also is directed to an energy recovery method using the energy recovery circuit.

2. Description of the Related Art

Generally, a plasma display panel (PDP) has a disadvantage of large power consumption. A reduction of such power consumption requires enhancing a light-emitting efficiency and minimizing an unnecessary energy waste occurring in a driving process without a direct relation to a discharge.

An alternating current (AC)-type PDP coats an electrode with a dielectric material to use a surface discharge occurring at the surface of the dielectric material. In this AC-type PDP, a driving pulse has a high voltage of tens of or hundreds of volts (V) to make a sustain discharge of tens of thousand of to hundreds of thousand cells, and has a frequency of more than hundreds of KHz. If such a driving pulse is applied to the cells, a charge/discharge having a high capacitance occurs.

When such a charge/discharge is generated at the PDP, a lot of energy loss occurs at the PDP in proportion to a frequency of the driving pulse. Particularly, if an excessive current flows in the cell upon discharge, then an energy loss is more increased. This energy loss causes a temperature rise of switching devices, which may break the switching devices in the worst case. In order to recover an energy generated unnecessarily within the panel, a driving circuit of the PDP includes an energy recovery circuit.

Referring to FIG. 1, an energy recovery circuit having been suggested by U.S. Pat. No. 5,081,400 of Weber includes first and second switches SW1 and SW2 connected, in parallel, between an inductor L and an external capacitor Css, a third switch SW3 for applying a sustain voltage Vs to a panel capacitor Cp, and a fourth switch SW4 for applying a ground voltage GND to the panel capacitor Cp.

First and second diodes D1 and D2 for limiting a reverse current are connected between the first and second switches SW1 and Sw2. The panel capacitor Cp is an equivalent expression of a capacitance value of the panel. Each of the switches SW1, SW2, SW3 and SW4 is implemented by a semiconductor switching device, for example, a MOS FET device.

An operation of the energy recovery circuit shown in FIG. 1 will be described in conjunction with FIG. 2, assuming that a voltage equal to Vs/2 should be charged in the capacitor Css.

In FIG. 2, Vcp and Icp represent charge/discharge voltage and current of the panel capacitor Cp, respectively.

At a time t1, the first switch SW1 is turned on. Then, a voltage stored in the capacitor Css is applied, via the first switch SW1 and the first diode D1, to the inductor L. Since the inductor L configures a serial LC resonance circuit along with the panel capacitor Cp, the panel capacitor Cp begins to be charged in a resonant waveform.

At a time t2, the first switch SW1 is turned off while the third switch SW3 is turned on. Then, a sustain voltage Vs is applied, via the third switch SW3, to the panel capacitor Cp.

From the time t2 until a time t3, a voltage of the panel capacitor Cp remains at a sustaining level.

At a time t3, the third switch SW3 is turned off while the second switch Sw2 is turned on. Then, a voltage of the panel capacitor Cp is recovered into the external capacitor Css by way of the inductor L, the second diode D2 and the second switch Sw2.

At a time t4, the second switch SW2 is turned off while the fourth switch SW4 is turned on. Then, a voltage of the panel capacitor Cp drops into a ground voltage GND.

The energy recovery circuits should satisfy conditions for enhancing a discharge characteristic of the panel, assuring a stable sustain time, and improving an efficiency of energy recovered from the panel. To this end, the conventional energy recovery circuit of FIG. 1 reduces an inductance of the inductor L to accelerate a rising time applied to the panel, thereby improving a discharge characteristic. Also, the energy recovery circuit increases an inductance of the inductor L to enhance energy recovery efficiency.

However, since the conventional energy recovery circuit of FIG. 1 uses the same inductor L at a charge/discharge path. Thus, if the inductor L of the energy recovery circuit is set to a small inductance value to accelerate a rising time, then a peak current is increased to deteriorate energy recovery efficiency. Otherwise, if the inductor L of the conventional recovery circuit is set to a large inductance value to improve an energy recovery efficiency, then a rising time of a voltage applied to the panel is lengthened to deteriorate a discharge characteristic and hence have a difficulty in assuring a sustain time.

SUMMARY OF THE INVENTION

Accordingly, it is an object of the present invention to provide an energy recovery circuit and an energy recovery method using the same wherein an energy stored in an inductor is applied to a panel to reduce a charge time and improve energy recovery efficiency.

In order to achieve these and other objects of the invention, an energy recovery circuit according to one aspect of the present invention includes a switch, a capacitor and an inductor provided to form a closed loop; and a panel capacitor equivalently provided at the panel, wherein when the switch is turned on, a current component of an energy is charged in the inductor by an energy charged in the capacitor, and when the switch is turned off, an inverse voltage is inducted into the inductor and a closed loop is formed by the inductor and the panel capacitor, thereby applying only an inverse voltage of the inductor to the panel capacitor.

In the energy recovery circuit, the capacitor is charged by an energy recovered from the panel capacitor.

The energy recovery circuit further includes a diode, being provided between the inductor and the panel capacitor, for applying a voltage from the inductor to the panel capacitor while shutting off other voltage.

The energy recovery circuit further includes a sustain voltage source for generating a sustain voltage; a second switch provided between the sustain voltage source and the panel capacitor to be turned on when a voltage from the sustain voltage source is applied to the panel capacitor; a third switch having one terminal connected to the switch and the capacitor and other terminal connected to a ground voltage source; and a fourth switch connected between the second switch and the ground voltage source.

The inverse voltage inducted into the inductor has approximately a voltage level of the sustain voltage source.

When the third switch is turned on, the capacitor, the panel capacitor and the second switch form a closed loop to recover an energy of the panel capacitor into the capacitor.

Otherwise, when the switch is turned off, the inductor into which said inverse voltage is inducted; the panel capacitor and the diode form a closed loop.

When the fourth switch is turned on, the panel capacitor is connected to any one of the ground voltage source and a zero voltage source for its initialization.

An energy recovery method according to another aspect of the present invention using an energy recovery circuit including a panel capacitor equivalently provided at a panel includes the steps of charging a current component of an energy into an inductor by utilizing an energy charged in the capacitor; deriving an inverse voltage into the inductor; and forming a closed loop by the inductor and the panel capacitor to apply only an inverse voltage of the inductor to the panel capacitor.

The energy recovery method further include the step of applying a voltage from the sustain voltage source to the panel capacitor.

The energy recovery method further includes the step of recovery an energy charged in the panel capacitor into the capacitor.

The energy recovery method further includes the step of connecting the panel capacitor to any one of the ground voltage source and a zero voltage source to initialize the panel capacitor.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 1:
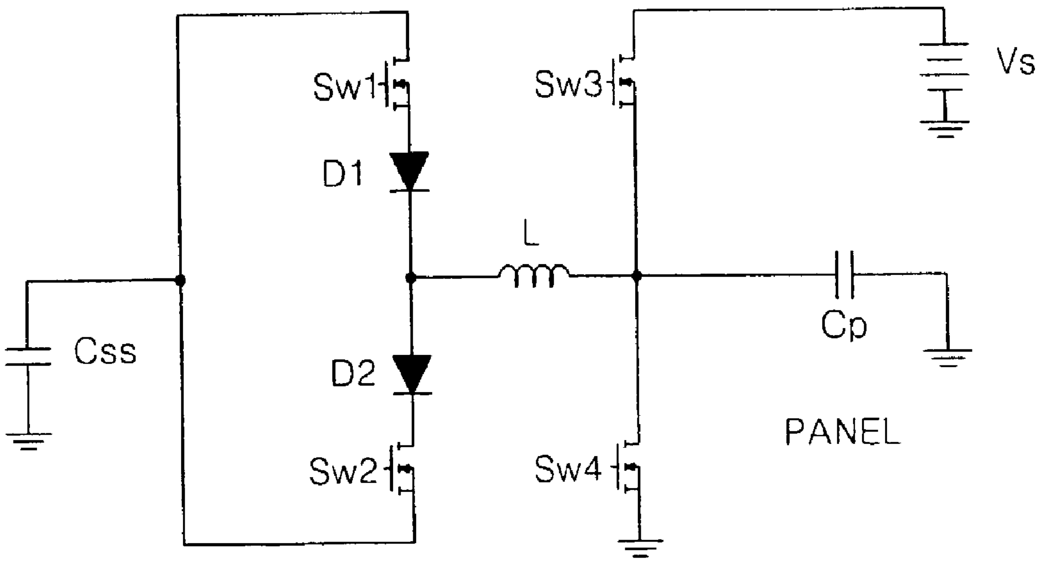
FIG. 1 PRIOR ART
FIG. 1 is a circuit diagram of a conventional energy recovery circuit.
Figure 2:
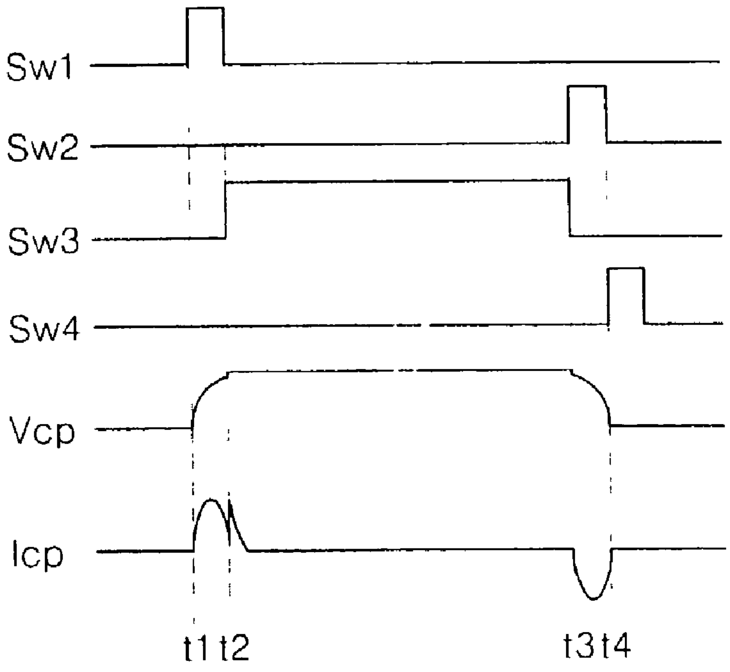
FIG. 2 PRIOR ART
FIG. 2 is a timing chart representing a switching operation of the energy recovery circuit of FIG. 1.
Figure 3:
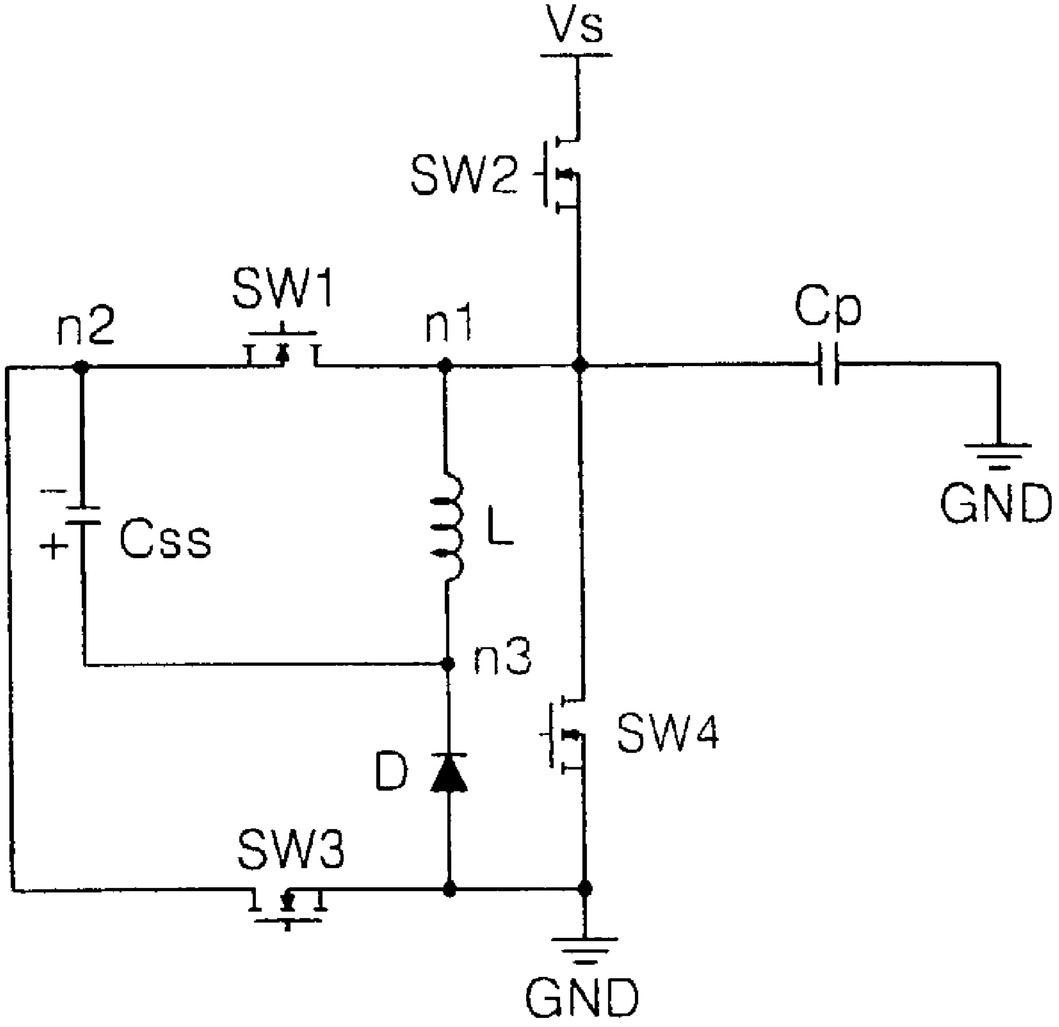
FIG. 3 is a circuit diagram of an energy recovery circuit according to an embodiment of the present invention.

Referring to FIG. 3, there is shown an energy recovery circuit according to an embodiment of the present invention.

The energy recovery circuit includes a capacitor Css, and an inductor L and a first switch SW1 connected to form a closed loop, a panel capacitor Cp connected, via a first node n1, to the inductor L and the first switch SW1, a second switch SW2 connected between a sustain voltage source Vs and the first node n1, a fourth switch SW4 connected between a ground voltage source GND and the first node n1, and a third switch SW3 connected, via a second node n2, to the first switch SW1 and the capacitor Css.

A diode D for controlling a current flow is provided between a third node n3 and the ground voltage source GND connected to the inductor L and the capacitor Css. The panel capacitor Cp represents an equivalent capacitance of the panel. Each of the switches S1, S2 and S3 is implemented by a semiconductor switching device, for example, a MOS FET device, IGBT, SCR and BJT, etc.

The first switch S1 forms a current closed loop extending from one terminal (+) of the capacitor Css, via the inductor L and the first switch SW1 at its on state, into other terminal (−) of the capacitor Css. At this closed loop, a current is accumulated into the inductor L due to electric charges discharged from the capacitor Css.

If the first switch SW1 is turned on, then a reverse voltage is inducted into the inductor L to apply a voltage to the panel capacitor Cp. If the second switch SW2 is turned on, then a voltage of the sustain voltage source Vs is applied to the panel capacitor Cp. If the third switch SW3 is turned on, then an energy of the panel capacitor Cp is recovered into the capacitor Css by way of the inductor L and the second switch SW2. If the fourth switch SW4 is turned on, then a voltage of the panel capacitor Cp is discharged to initialize the panel capacitor Cp.

Figure 4:
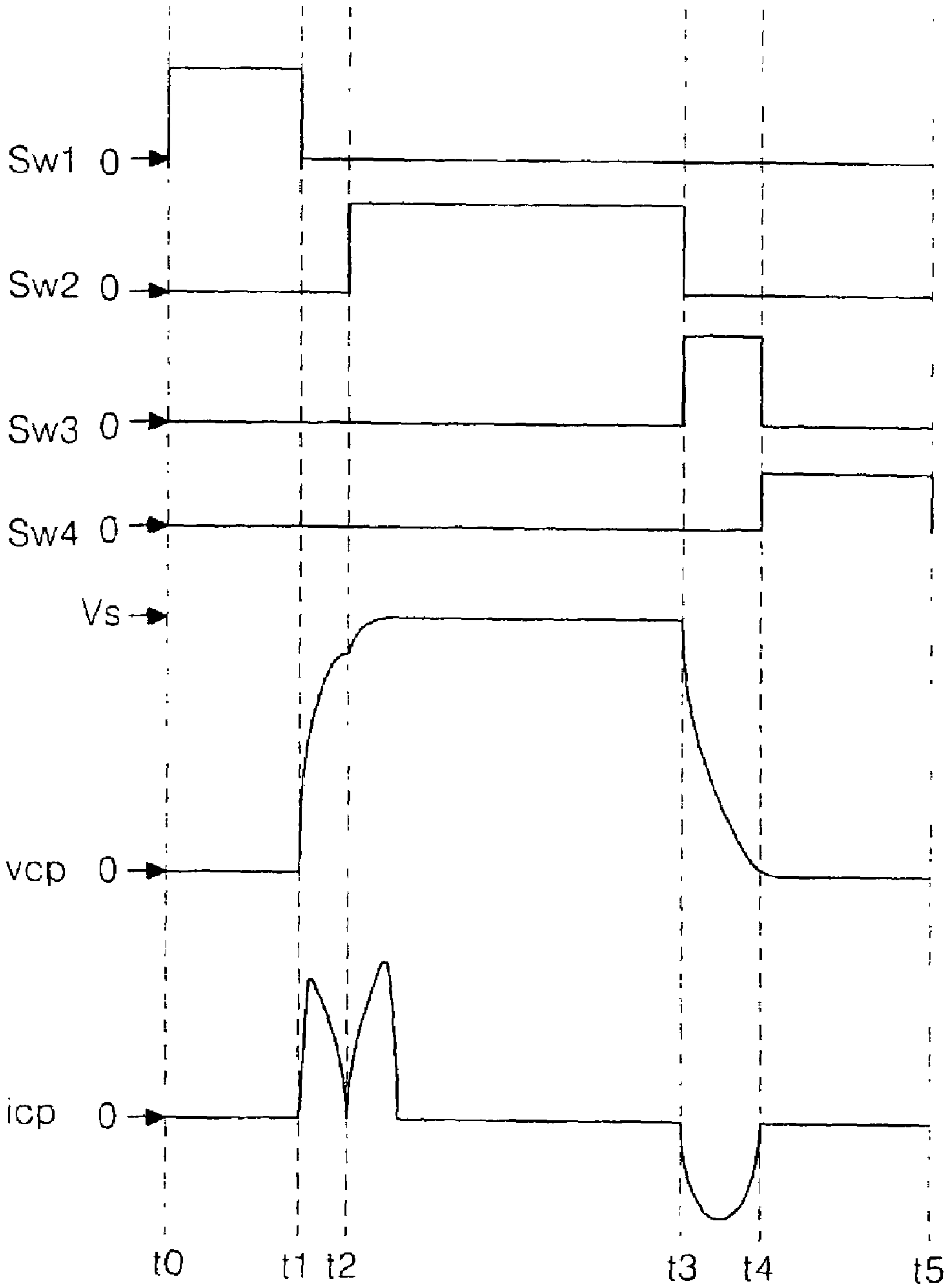
FIG. 4 is a timing chart representing a switching operation of the energy recovery circuit of FIG. 3.

Hereinafter, an operation of the energy recovery circuit shown in FIG. 3 will be described in conjunction with FIG. 4 assuming that a desired voltage (e.g., 30V to 90V) is charged in the capacitor Css. In FIG. 4, Vcp and ICp represents charge/discharge voltage and current of the panel capacitor Cp, respectively.

Figure 5:
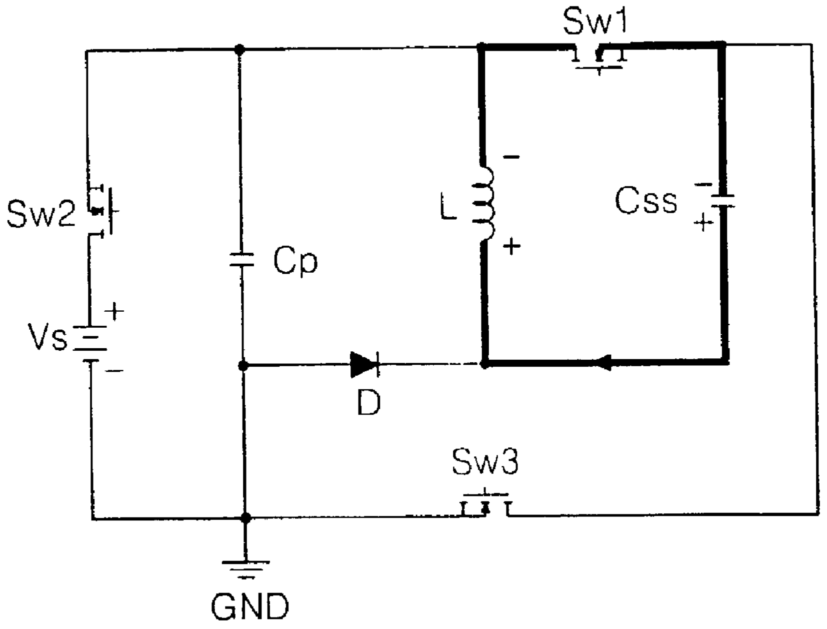
FIG. 5 is a circuit diagram representing an inductor charging process of the energy recovery circuit of FIG. 3.

At a time interval from t0 until t1, the first switch SW1 is turned on such that the capacitor Css, the inductor L and the first switch SW1 form a closed loop as shown in FIG. 5. During this time interval, a current is charged in the inductor L due to electric charges discharged from the capacitor Css. At this time, a turn-on time of the first switch SW1 is set such that a deriving voltage of the inductor L can rise until approximately Vs.

Figure 6:
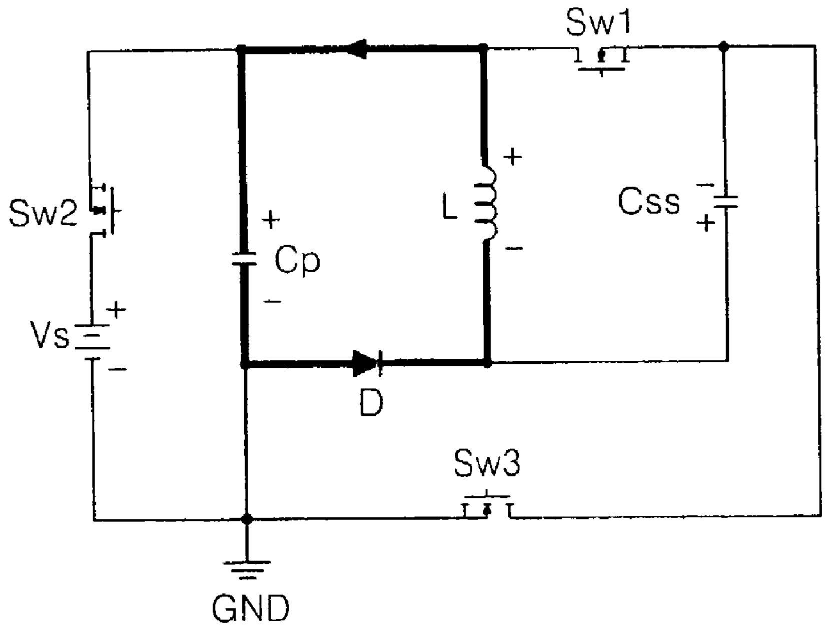
FIG. 6 is a circuit diagram representing a panel capacitor charging process of the energy recovery circuit of FIG. 3.

At a time interval from t1 until t2, the first switch SW1 is turned off such that an inverse voltage is inducted into the inductor L as shown in FIG. 6. When an inverse voltage is inducted into the inductor L, a current charged in the inductor L is applied to the panel capacitor Cp. In other words, the inductor L, the panel capacitor Cp and the diode D form a closed loop at a time interval from t1 until t2. Thus, a current charged in the inductor L is applied to the panel capacitor Cp. At this time, a resonance of the inductor L and the panel capacitor Cp allows a voltage of approximately Vs to be charged in the panel capacitor Cp.

When compared with the conventional energy recovery circuit, the present energy recovery circuit stores energy into the inductor L and instantaneously applies the energy stored in the inductor L to the panel capacitor Cp to thereby have a faster rising time than the conventional energy recovery circuit. Such a faster rising time can raise a voltage charged in the panel capacitor Cp to be closer to Vs, thereby reducing an input current and thus improving power recovery efficiency.

Figure 7:
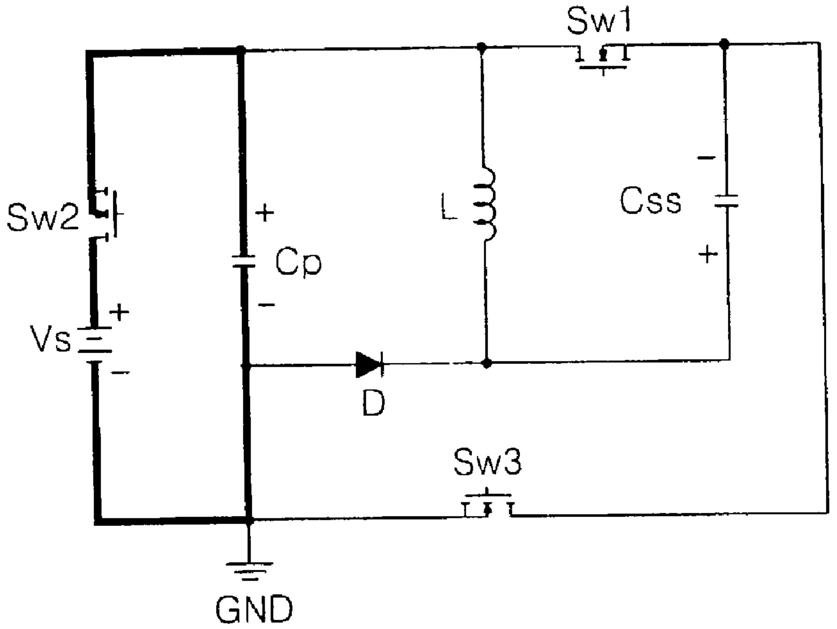
FIG. 7 is a circuit diagram representing a process of applying a sustain voltage to a panel capacitor of the energy recovery circuit shown in FIG. 3.

At a time interval from t2 until t3, the second switch SW2 is turned on such that a closed loop is formed among the sustain voltage source Vs, the second switch SW2 and the panel capacitor Cp as shown in FIG. 7. Then, a sustain voltage Vs is fed, via the second switch SW2, to the panel capacitor Cp to maintain a voltage level of the panel capacitor Cp at a sustain voltage level. At this time, a quantity of energy applied from the sustain voltage source Vs is reduced by a voltage applied to the panel capacitor Cp during a time interval from t1 until t2. Meanwhile, a sustain discharge is generated at electrodes provided within the cells of the panel during a time interval from t2 until t3.

Figure 8:
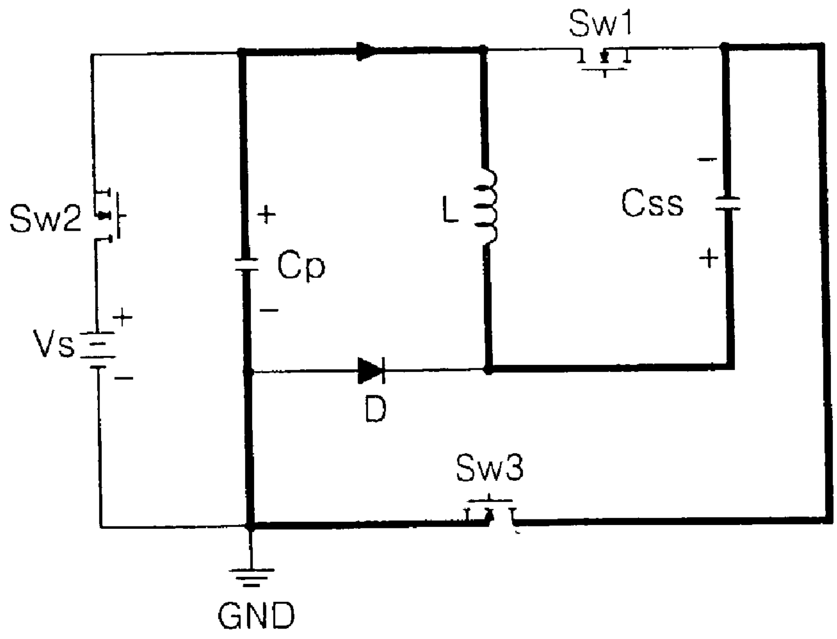
FIG. 8 is a circuit diagram representing a voltage recovery process of the energy recovery circuit of FIG. 3.

At a time interval from t3 until t4, the third switch SW3 is turned on. At this time, the energy recovery circuit shown in FIG. 3 can be expressed by a circuit as shown in FIG. 8. If the third switch SW3 is turned on, a closed loop is formed among the panel capacitor Cp, the inductor L, the capacitor Css and the third switch SW3. Then, a voltage charged in the panel capacitor Cp is recovered into the capacitor Css. Meanwhile, the third switch SW3 for a voltage recovery function is connected to the ground voltage source GND. In other words, the second switch SW2 maintains a stable ground level independently of a voltage applied from the exterior thereof. Accordingly, the third switch SW3 can have a stable switching operation and a characteristic intensive to a noise. Furthermore, the third switch SW3 maintaining a stable ground level permits an easy driving of a drive integrated circuit.

Figure 9:
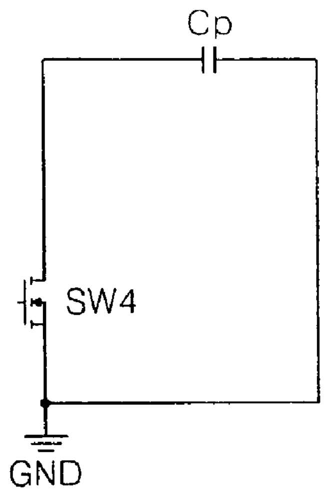
FIG. 9 is a circuit diagram representing an initialization process of the panel capacitor in FIG. 3.

At a time interval from t4 until t5, the fourth switch SW4 is turned on. At this time, the energy recovery circuit shown in FIG. 3 can be expressed by a circuit as shown in FIG. 9. If the fourth switch SW4 is turned on, the panel capacitor Cp is connected, via the fourth switch SW4, to the ground voltage source GND. At this time, a residual voltage at the panel capacitor Cp is discharged to initialize the panel capacitor Cp. In real, the present energy recovery circuit repeats a range from t0 until t5 to apply a sustain pulse to the panel.

Figure 10:
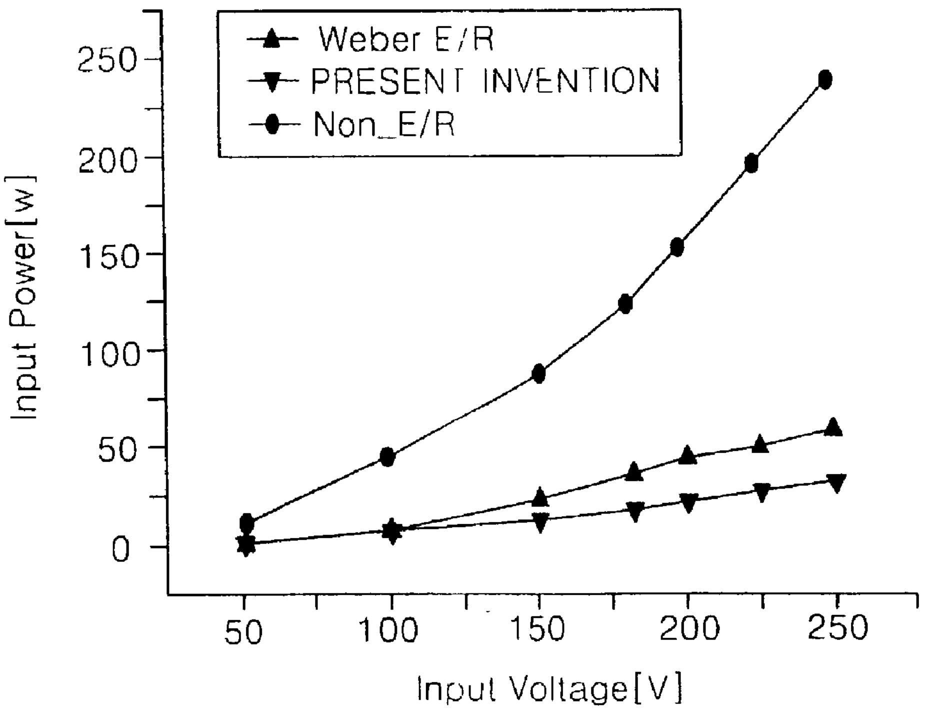
FIG. 10 is a graph representing an input voltage according to a sustain voltage of the energy recovery circuit shown in FIG. 3.

FIG. 10 is a graph representing an input voltage according to the sustain voltage.

It can be seen from FIG. 10 that an input power when no energy recovery circuit is used as indicated by Non_E/R becomes lower than that when the conventional energy recovery circuit as indicated by Weber E/R or the present energy recovery circuit is used. Particularly, an input power when the present energy recovery circuit becomes lower than that when the conventional energy recovery circuit Weber E/R is used.

As described above, according to the present invention, energy is stored into the inductor and the energy stored in the inductor is instantaneously applied to the panel capacitor, thereby having a fast rising time. Furthermore, the fast rising time can raise a voltage charged in the panel capacitor to be closed to a sustain voltage, thereby reducing an input current and thus improving a power recovery efficiency.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. An energy recovery circuit for recovering energy from a panel, comprising:

a first switch, a capacitor and an inductor provided to form a first closed loop;

a panel capacitor equivalently provided at the panel;

a sustain voltage source;

a second switch coupled between the sustain voltage source and the panel capacitor, and wherein when the first switch is turned on, a current component of an energy is charged in the inductor by an energy charged in the capacitor, and when the first switch is turned off, an inverse voltage is induced into the inductor and a second closed loop is formed by the inductor and the panel capacitor, thereby applying only an inverse voltage of the inductor to the panel capacitor.

2. The energy recovery circuit as claimed in claim 1, wherein the capacitor is charged by energy recovered from the panel capacitor.

3. The energy recovery circuit as claimed in claim 1, further comprising:

a diode, being provided between the inductor and the panel capacitor, for applying a voltage from the inductor to the panel capacitor while shutting off other voltage.

4. The energy recovery circuit as claimed in claim 1, wherein the sustain voltage source for generating a sustain voltage, and the second switch to be turned on when a voltage from the sustain voltage source is applied to the panel capacitor, the second switch being different than the first switch, the energy recovery circuit further comprising:

a third switch having one terminal connected to the first switch and the capacitor and another terminal connected to a ground; and a fourth switch connected between the second switch and the ground.

5. The energy recovery circuit as claimed in claim 3, wherein said inverse voltage induced into the inductor has approximately a voltage level of the sustain voltage source.

6. The energy recovery circuit as claimed in claim 4, wherein when the third switch is turned on, the capacitor, the panel capacitor and the third switch form a third closed loop to recover an energy of the panel capacitor into the capacitor.

7. The energy recovery circuit as claimed in claim 3, wherein when the first switch is turned off, the inductor into which said inverse voltage is induced, the panel capacitor and the diode form the second closed loop.

8. The energy recovery circuit as claimed in claim 4, wherein when the first switch is turned off, the inductor into which said inverse voltage is induced, the panel capacitor and the diode form the second closed loop.

9. The energy recovery circuit as claimed in claim 4, wherein when the fourth switch is turned on, the panel capacitor is connected to the ground for its initialization.

10. An energy recovery method using an energy recovery circuit including a panel capacitor equivalently provided at a panel, comprising the steps of:

charging a current component of an energy into an inductor by utilizing an energy charged in the capacitor;

deriving an inverse voltage into the inductor;

forming a closed loop by the inductor and the panel capacitor to apply only an inverse voltage of the inductor to the panel capacitor; and connecting the panel capacitor to ground to initialize the panel capacitor.

11. The energy recovery method as claimed in claim 10, further comprising the step of:

applying a voltage from a sustain voltage source to the panel capacitor.

12. The energy recovery method as claimed in claim 10, further comprising the step of:

recovering an energy charged in the panel capacitor into the capacitor.

13. The energy recovery circuit as claimed in claim 1, wherein the first closed loop is formed from one terminal of the capacitor, via the inductor and the first switch, into another terminal of the capacitor.

14. The energy recovery circuit as claimed in claim 1, wherein when the first switch is on, current is charged in the inductor due to electric charges discharged from the capacitor.

15. An energy recovery circuit for a plasma display panel, comprising:

a first switch between nodes of a capacitor and an inductor;

a sustain voltage source; and a second switch between the sustain voltage source and a panel capacitance, wherein when the first switch is on, a closed loop is formed from one terminal of the capacitor, via the inductor and the first switch, into another terminal of the capacitor to store energy into the inductor based on charges of the capacitor, and when the first switch is off, an inverse voltage is induced at the inductor and the stored energy is provided to the panel capacitance.

16. The energy recovery circuit as claimed in claim 15, wherein when the first switch is off, another closed loop is formed by the inductor and the panel capacitance.

17. The energy recovery circuit as claimed in claim 16, wherein when the first switch is off, only the inverse voltage of the inductor is applied to the panel capacitance.

18. The energy recovery circuit as claimed in claim 15, wherein the capacitor is charged by energy from the panel capacitance.

19. The energy recovery circuit as claimed in claim 15, further comprising:

a diode between the inductor and the panel capacitance to apply a voltage from the inductor to the panel capacitance while shutting off other voltages.

20. The energy recovery circuit as claimed in claim 15, wherein the sustain voltage source to generate a sustain voltage, the second switch to be turned on when a voltage from the sustain voltage source is applied to the panel capacitance, the second switch being different than the first switch, the energy recovery circuit further comprising:

a third switch having one terminal coupled to the first switch and the capacitor and another terminal coupled to GROUND; and a fourth switch coupled between the second switch and GROUND.

21. The energy recovery circuit as claimed in claim 20, wherein when the first switch is off, only the inverse voltage of the inductor is applied to the panel capacitance.

22. The energy recovery circuit as claimed in claim 21, wherein said inverse voltage is approximately a voltage level of the sustain voltage source.

23. The energy recovery circuit as claimed in claim 20, wherein when the third switch is turned on, the capacitor, the panel capacitance and the third switch form another closed loop to recover energy of the panel capacitance into the capacitor.

24. The energy recovery circuit as claimed in claim 20, wherein when the first switch is turned off, the inductor, the panel capacitance and the diode form another closed loop.

25. The energy recovery circuit as claimed in claim 20, wherein when the fourth switch is turned on, the panel capacitance is coupled to GROUND to initialize the panel capacitance.

26. An energy recovery method of a plasma display panel comprising:

turning on a first switch to store energy from a capacitor into an inductor;

turning off the first switch to apply current to a panel capacitance based on an inverse voltage induced at the inductor; and turning on a second switch to apply a voltage from a sustain voltage source to the panel capacitance.

27. The energy recovery method of claim 26, wherein turning on the first switch forms a closed loop from one terminal of the capacitor, via the inductor and the first switch, into another terminal of the capacitor.

28. The energy recovery method of claim 27, wherein turning off the switch forms another closed loop that includes the inductor and the panel capacitance.

29. The energy recovery method as claimed in claim 28, wherein the second switch is provided between the sustain voltage source and the panel capacitance, the second switch being different than the first switch.

30. The energy recovery method as claimed in claim 28, further comprising:

recovering energy in the panel capacitance into the capacitor.

31. The energy recovery method as claimed in claim 28, further comprising:

coupling the panel capacitance to GROUND to initialize the panel capacitance.

32. An energy recovery circuit comprising:

a first switch, a second switch, a third switch and a fourth switch that operate to charge and discharge a panel capacitance;

an inductor;

a capacitor; and a sustain voltage source to provide a sustain voltage, wherein the second switch is provided between the sustain voltage source and the panel capacitance and is turned on for applying the sustain voltage source to the panel capacitance, the third switch having one terminal coupled to the first switch and the capacitor and another terminal coupled to a prescribed potential, and the fourth switch is coupled between the second switch and the prescribed potential.

33. The energy recovery circuit of claim 32, wherein when the first switch is turned on, a current component of energy is charged in the inductor based on energy in the capacitor.

34. The energy recovery circuit of claim 32, when the first switch is turned off, an inverse voltage is induced into the inductor and a closed loop is formed by the inductor and the panel capacitance, thereby applying an inverse voltage of the inductor to the panel capacitance.

35. The energy recovery circuit of claim 34, wherein said inverse voltage is approximately a voltage level of the sustain voltage source.

36. The energy recovery circuit of claim 32, further comprising:

a diode provided between the inductor and the panel capacitance to apply a voltage from the inductor to the panel capacitance while shutting off other voltages.

37. The energy recovery circuit of claim 36, wherein when the first switch is turned off, the inductor, the panel capacitance and the diode form a closed loop.

38. The energy recovery circuit of claim 32, wherein when the third switch is turned on, the capacitor, the panel capacitance and the third switch form a closed loop to recover energy of the panel capacitance into the capacitor.

39. The energy recovery circuit of claim 32, wherein when the first switch is turned off, the inductor, the panel capacitance and the diode form a closed loop.

40. The energy recovery circuit of claim 32, wherein when the fourth switch is turned on, the panel capacitance is coupled to GROUND for initialization.

41. The energy recovery circuit of claim 32, wherein the fourth switch is directly coupled to the prescribed potential.

42. The energy recovery circuit of claim 32, wherein the another terminal of the third switch is directly coupled to the prescribed potential.

* * * * *